Patented Sept. 29, 1942

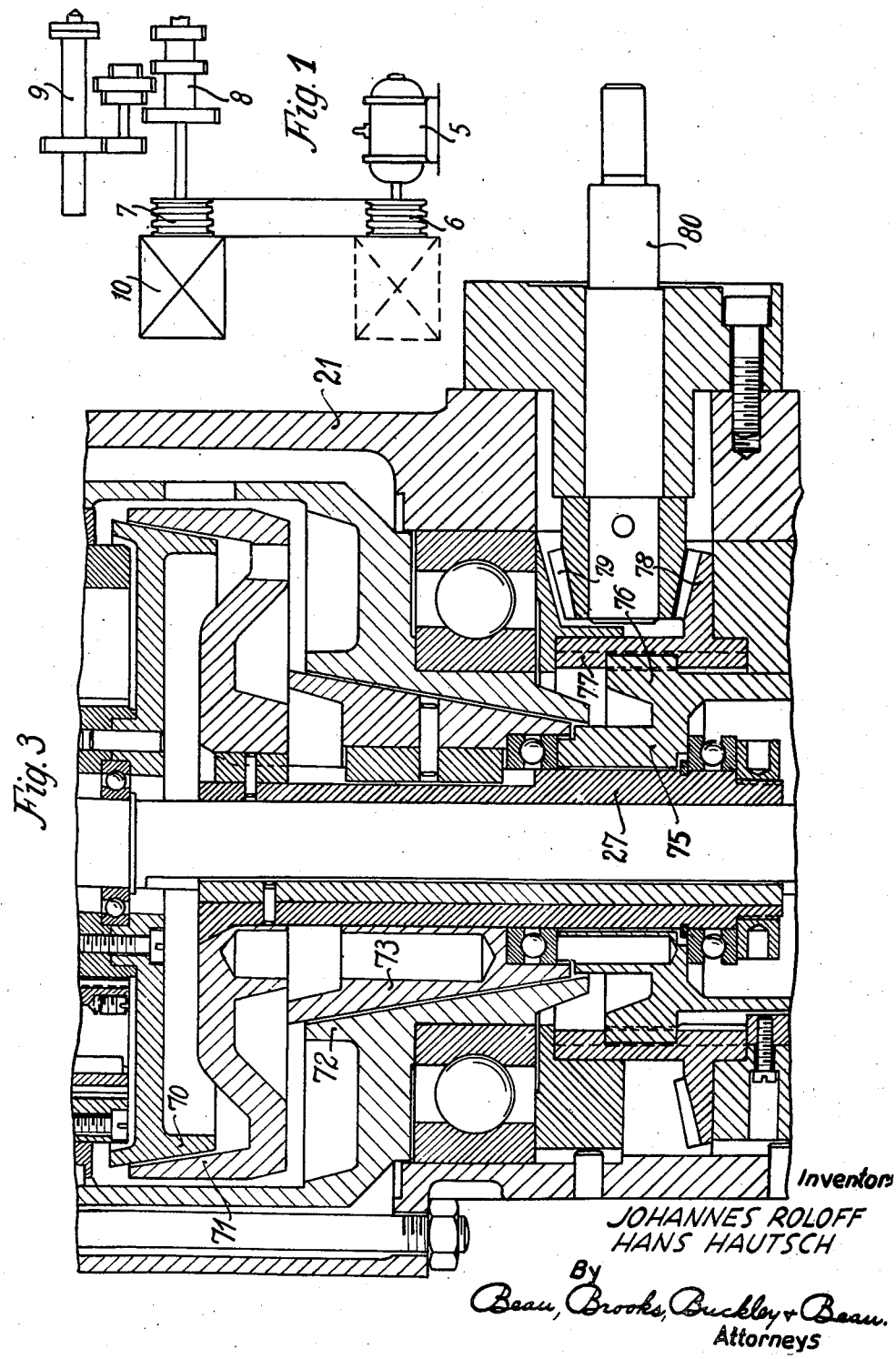

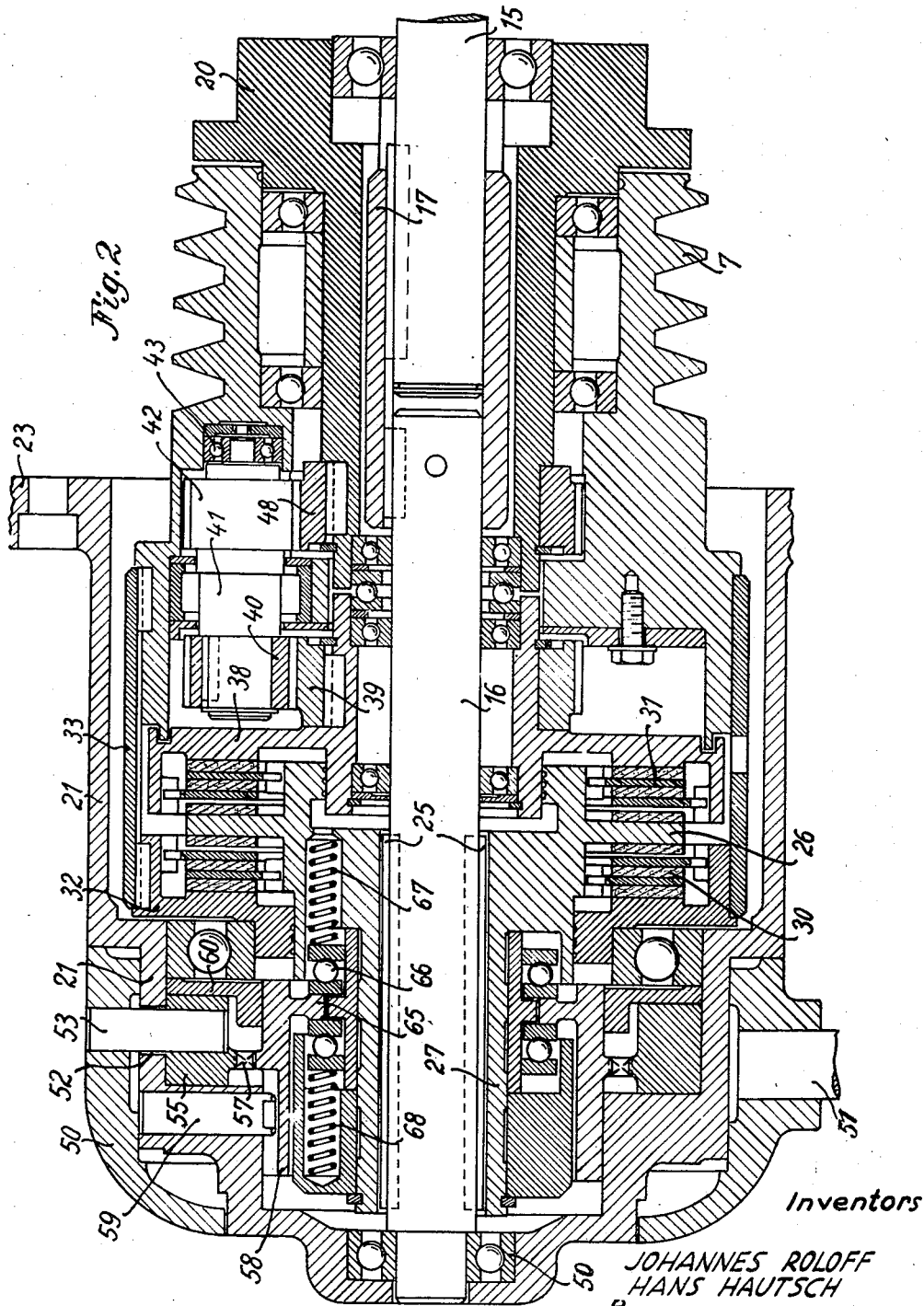

2,297,433

UNITED STATES PATENT OFFICE 2,297,433

REDUCTION GEAR ATTACHMENT

Johannes Roloff, Altenburg, Thuringia, and Hans Hautsch, Meuselwitz, Thuringia, Germany; vested in the Alien Property Custodian Application March 12, 1940, Serial No. 323,600
In Germany February 22, 1939

12 Claims. (Cl. 82—29)

With change gears of the conventional design as used in machine tools, especially high-speed lathes and turret lathes, it is normally impossible or impracticable to change over from turning to screw-cutting or reaming work by employing speed reduction gearing.

The object of our present invention, therefore, is to make possible such operations by the use of a small reduction gear which can be subsequently attached to an existing usual machine tool so as to permit speed changing. Particularly, such changing operation is enabled, according to this invention, by just moving a lever, without modifying either the drive or other details of the lathe.

More in detail, our invention is achieved by providing a reduction gear attachment embodying an extension shaft supported on a structure which can be attached to the machine tool, the said shaft connecting with the driving mechanism of the latter, e. g. the head stock or driving motor, and carrying a flange, a sleeve or similar means which can be coupled to the driving pulley either direct or through a reduction gear by means of a double-acting clutch.

A reduction gear of the type thus described can be flanged, for example, to the headstock or base of the machine tool, preferably in such a way that the driving pulley is rotatably arranged on a bushing which serves as a guide for the gear extension shaft and the headstock drive shaft or driving motor shaft connected to the former, the said bushing being designed so that it can be attached to the body of the machine tool.

The desired down gearing in the reduction gear attachment is preferably obtained by means of epicyclic gears, using a double-acting disc clutch or one clutch for transmitting the drive to the headstock or other convenient part of the machine tool, but, of course, other types of reduction gearing and/or clutch may be used as well.

These and other details of our invention may be gathered from the accompanying drawings, which illustrate some embodiments of the invention and where Fig. 1 is a diagram showing the method of gear changing, Fig. 2 is a longitudinal section through a reduction gear according to the invention, Fig. 3 is a longitudinal section of another clutch and operating member.

Referring now to Fig. 1, 5 denotes the motor of a high-speed lathe which may be installed in the base of the lathe and carries on its shaft the V-belt pulley 6. The said pulley drives a counter-pulley 7 arranged on the shaft connecting with the headstock 8; 9 represents the spindle.

In the arrangement as shown in the drawings, the V-belt pulley 7 is attached to a reduction gear 10 which may also be secured to the pulley 6, as indicated in the drawings. Details of the reduction gear appear from Fig. 2.

In Fig. 2, 15 represents the drive shaft which connects with the headstock 8. Arranged in line with it is an extension shaft 16, these shafts being coupled together by a sleeve 17.

The shafts 15, 16 are supported at one end in a guide bush 20 attached to the body of the lathe; at the other end, shaft 16 bears in a supporting structure 21 which has its flange 23 likewise secured to the body of the lathe.

As will be seen, the V-belt pulley is rotatably arranged on the guide bush 20. The drive which comes through it is transmitted to the extension shaft 16 and thence to the shaft 17, since shaft 16 carries a sleeve 27 with flange 26, which sleeve is non-rotatably arranged on shaft 16 by means of keys 25, but is free to slide lengthwise. Sleeve 27 can be coupled to belt pulley 7 through a double-acting clutch either direct or via a reduction gear, as described hereafter.

Flange 26 is designed in such manner as to represent one half of a double-acting disc clutch 30, 31 of which member 30 is secured to a ring 32 which in turn is coupled to the belt pulley 7 through the annular member 33. Consequently, when the sleeve 27 and flange 26 are moved to the left, thus engaging the clutch, the drive is transmitted through parts 7, 33, 32, 30, 26, 27, 16 and 15 to the headstock 8.

The clutch half 31 is arranged on an annular member 38 to which is keyed a gear 39. Engaging the latter are a plurality of pinions 40 carried on a common shaft 41 together with the planet gears 42 and supported on ball bearings in recesses of the belt pulley 7, as indicated at 43.

The planet gears 42 are arranged to mesh with a sun wheel 48 which is non-rotatably arranged on the guide bush 20.

Now, with the arrangement as described, when the flange 26 is moved to the right, thus engaging clutch 31, the drive is transmitted from the belt pulley 7 via parts 42, 41, 40, 39, 38, 31, 26 and 27 to the shafts 16, 15 with a corresponding ratio of down gearing.

Control of the double-acting disc clutch is as follows, reference being had to Fig. 2:

The supporting structure 21 carries a cap 50 which can be rotated within certain limits and bears a handle 51. Through a slot 52 in the supporting structure 21 a pin 53 engages a shift ring 55 on which helical teeth 57 are provided. The said teeth engage corresponding teeth on a shift sleeve 58 which is prevented from rotating by a pin 59, but is free to move lengthwise in relation to the structure 21 and is supported by a ring 60. The shift sleeve 58 engages the sleeve 27 by means of a lug or plurality of lugs 65.

Now, when cap 50 is rotated, causing the ring 55 to participate in such rotation, sleeve 58 will move to the right or left, depending on the direction of rotation, and the lugs 65 will act on the sleeve 27 through ball bearings 66 and springs 67, 68 to the effect that flange 26 is drawn against the clutch 30 or 31.

The springs 67, 68 supply the pressure for the double-acting disc clutch which is set so as to be in proper relation to the torque which is to be transmitted. Owing to the presence of these springs, special clutch pressure adjusting devices are not required. Moreover, the fact that the spring pressure remains constant (irrespective of the force applied at the handle) protects the lathe against overloading.

Fig. 3 shows a mode of carrying out the invention in which a double-acting cone clutch 72, 73 is used instead of the disc clutch. Balance springs are not required with this arrangement.

Fig. 3 further shows another method of clutch operation which would also be applicable to the arrangement depicted in Fig. 2. The operating member 75 which engages the sleeve 27 and is arranged in such a way that it can move lengthwise but cannot be rotated, carries on its outer circumference a screw 76 engaging an internally screw threaded member 77. The latter can be rotated through a bevel gear 78 attached to it by turning the bevel gear 79 which meshes with the gear 78 by means of the shaft 80 which is rotatably arranged in the structure 21. This can be done with the aid of a handwheel. Depending on the direction of rotation of the shaft 80, the screw 76 and, consequently, the operating member 75, is moved one way or other, and since the clutch halves 73 and 71 are secured to the sleeve 27, such movement will engage either clutch 72 or clutch 70.

What we claim is:

1. In a machine tool, such as a high-speed lathe or a turret lathe, having a supporting structure on the body thereof, a reduction gear attachment comprising an extension shaft carried on the supporting structure, a driving element for said machine tool, a connecting member fixed on said extension shaft, a double-acting friction clutch and a reduction gear, said clutch adapted to connect the driving element either directly or through said reduction gear to said connecting member.

2. In a machine tool of the class described, having a supporting structure on the body thereof, a reduction gear attachment comprising an extension shaft carried on the supporting structure, a pulley for driving the headstock of said machine tool, a sleeve fixed on said extension shaft, a double acting friction clutch, and an epicyclic reduction gear, said clutch adapted to connect said pulley either directly or through said reduction gear to said sleeve.

3. In a machine tool of the class described such as a high-speed lathe or a turret lathe, having a supporting structure on the body thereof, a bushing carried by said body, a reduction gear attachment comprising a headstock shaft carried on the supporting structure and rotatably supported by said bushing, a driving element for said machine tool rotatably supported on said bushing, a connecting member fixed on said headstock shaft, a double-acting friction clutch and a reduction gear, said clutch adapted to connect the driving element either directly or through said reduction gear to said connecting member.

4. In a machine tool, such as a lathe, having a supporting structure on the body thereof, a reduction gear attachment comprising an extension shaft carried on the supporting structure, a pulley for driving the headstock of said machine tool, a sleeve fixed on said extension shaft, a double-acting friction clutch, an epicyclic reduction gear including a pair of connected planet gears and a sun gear meshing with each of said planet gears, a bushing secured on the body of the machine tool, a driving shaft of the headstock, said clutch being adapted to connect said pulley either directly or through said epicyclic gear to said sleeve, said bushing rotatably supporting said pulley and carrying one of the sun gears of said epicyclic gear, said pulley rotatably supporting the planet gears, and one element of said clutch carrying the other of said sun gears.

5. In a machine tool of the class described, having a supporting structure on the body thereof, a reduction gear attachment comprising an extension shaft carried on the supporting structure, a pulley for driving the headstock of said machine tool, a double acting friction clutch, a flanged sleeve splined to said extension shaft for axial movement thereon, the flange of the sleeve constituting the central element of the clutch, and an epicyclic reduction gear including a pair of coaxial sun gears, one end element of the clutch being secured to one of said sun gears and the other end element of the clutch being secured to said pulley, said clutch adapted to connect said pulley either directly or through said reduction gear to said sleeve.

6. In a machine tool of the class described, having a supporting structure on the body thereof, a reduction gear attachment comprising an extension shaft carried on the supporting structure, a pulley for driving the headstock of said machine tool, a double acting friction clutch, a sleeve splined to said extension shaft for axial movement thereon and having a flange constituting the central element of said friction clutch, an epicyclic reduction gear, said clutch adapted to connect said pulley either directly or through said reduction gear to said sleeve, an operating member adapted to engage said sleeve, and a controlling member rotatably mounted on said supporting structure, said operating and controlling members having co-acting helical faces, whereby when the controlling member is rotated the operating member and said sleeve will be shifted axially.

7. In a machine tool of the class described, having a supporting structure on the body thereof, a reduction gear attachment comprising an extension shaft carried on the supporting structure, a pulley for driving the headstock of said machine tool, a double-acting friction clutch, a sleeve splined to said extension shaft for axial movement thereon and having a flange constituting the central element of said friction clutch, an epicyclic reduction gear, said clutch being adapted to connect said pulley either directly or through said reduction gear to said sleeve, an operating member having springs on opposite sides thereof for transmitting axial motion of the operating member to said sleeve, and a controlling member rotatably mounted on said supporting structure, said operating and controlling members having co-acting helical faces, whereby when the controlling member is rotated the operating member will be shifted axially.

8. In a machine tool of the class described, having a supporting structure on the body thereof, a reduction gear attachment comprising an extension shaft carried on the supporting structure, a pulley for driving the headstock of said machine tool, a double-acting friction clutch, a sleeve splined to said extension shaft for axial movement thereon and having a flange constituting the central element of said friction clutch, an epicyclic reduction gear, said clutch being adapted to connect said pulley either directly or through said reduction gear to said sleeve, an axially shiftable operating member for said clutch, a controlling element rotatably mounted on said supporting structure, said operating and controlling elements having interengaging internally and externally screw threaded parts whereby upon rotation of the controlling element the operating element will be shifted axially.

9. A machine tool of the class described having a headstock and a drive shaft therefor, a driving element for the tool, a reduction gear set driven by said driving element and having a driven element, friction clutch means for selectively connecting said headstock drive shaft either to said driven element of the reduction gear set or to said driving element, and manually operable means for controlling said friction clutch means to effect either of said connections.

10. A machine tool of the class described having a supporting structure, a headstock and a drive shaft therefor, a driving element for the tool and a pair of connected planet gears carried by said driving element, a sun gear stationary with respect to said supporting structure and engaging one of said planet gears, a second sun gear engaging the other of said planet gears, friction clutch means for selectively connecting the headstock drive shaft either to said second sun gear or to said driving element, and manually operable means for controlling said friction clutch means to effect either of said connections.

11. A machine tool of the class described having a supporting structure, a headstock and a drive shaft therefor, a bushing through which said drive shaft extends and carried by said supporting structure, a drive element for the tool rotatable upon said bushing and carrying a pair of connected planet gears, a sun gear fixed to said bushing and engaging one of said planet gears, a second sun gear engaging the other of said planet gears, a driving clutch element carried by said second sun gear, a second driving clutch element spaced axially from the first driving clutch element and carried by said drive element, and a driven clutch element between said driving clutch element and carried by said headstock drive shaft, and control means carried by the supporting structure for effecting a relative axial shifting of said driving and driven clutch elements to cause the latter to be driven, selectively, by one or the other of said driven clutch elements.

12. A machine tool attachment comprising a stationary bushing, a shaft rotatable within said bushing, and an element rotatable upon said bushing, a pair of connected planet gears carried by said element and a sun gear fixed to the bushing engaging one of said planet gears, a clutch element rotatable about the axis of shaft and carrying a sun gear engaging the other of said planet gears, a second clutch element rotatable about the axis of the shaft and spaced axially from the first clutch element, a third clutch element carried by the shaft, and control means carried by the supporting structure effecting a relative axial shifting of said clutch elements to selectively engage the first and the third clutch elements or the second and third clutch elements.

JOHANNES ROLOFF.
HANS HAUTSCH.